United States Patent Office 2,720,508
Patented Oct. 11, 1955

2,720,508

POLYUREIDOPOLYAMIDES

Sidney Melamed, Philadelphia, Pa., assignor to Rohm & Haas Company, Philadelphia, Pa., a corporation of Delaware No Drawing. Application November 28, 1952,
Serial No. 323,138

11 Claims. (Cl. 260—77.5)

This invention deals with ureido derivatives of condensates formed by reacting together caprolactam and alkylene polyamines and with processes for forming these derivatives.

The self-condensation of epsilon-caprolactam leads to long-chained linear polymers. On the other hand reaction of caprolactam with an equivalent of a primary or secondary monoamine has been shown to result in polymeric products with relatively short chains which are still linear but are terminated with an N-substituted amide group and a single amine group. It has now been found that when epsilon-caprolactam is mixed with an alkylene polyamine and the mixture is heated, products result which contain both amide and amine nitrogen, which are terminated with amine groups, and which can be reacted with urea.

When the proportions of caprolactam mixed with alkylene polyamine are from one to one to three to one (by moles), water-soluble condensates result which are particularly useful for reacting with urea.

As alkylene polyamines there may be used ethylenediamine, propylenediamine, diethylenetriamine, triethylenetetramine, tetraethylenepentamine, pentaethylenehexamine, and similar polyethylenepolyamines, dipropylenetriamine, N,N'-di(aminoethyl)propylenediamine, etc. Mixtures of alkylene polyamines are quite as useful as individual amines. Commercial polyamines are apt to be mixtures in which one of the polyamines predominates but in which both lower and higher polyamines may be present.

The reaction between caprolactam and alkylene polyamine is effected at temperatures between about 150° and about 250° C., preferably between 180° and 230° C. After reaction between caprolactam and polyamine has been effected, unreacted amine is desirably removed, conveniently by heating the reaction mixture under reduced pressure. A gas may be passed through the reaction mixture to stir it and to assist in taking off polyamine.

This reaction may be effected, if desired, in the presence of an inert organic solvent such as naphtha, toluene, xylene, high boiling ethers, and the like. If necessary, the reaction can be accomplished under pressure.

The reaction product obtained in this way may be mixed with urea and formaldehyde or melamine and formaldehyde, which are reacted to form cationic condensates.

The condensate of caprolactam and alkylene polyamine is here reacted with urea at temperatures between 100° and 200° C., preferably between 110° and 160° C. The amount of urea used in the reaction mixture depends upon the number of amino groups present having hydrogen on the nitrogen thereof. Proportions from one mole of urea for every two —NH— groups through one to one to an excess of urea per —NH— group may be used. When excess urea is taken, essentially all of the basic —NH— groups are reacted to form the ureido derivative and free urea may remain in the mixture and can be then reacted with formaldehyde.

Urea and caprolactam-polyamine condensate may conveniently be mixed in concentrated aqueous solution. If desired, the water may be evaporated from this mixture or the concentrated mixture may be heated directly.

Reaction between urea and caprolactam-alkylene polyamine condensate begins between 100° and 110° C. with evolution of ammonia. At 160°–200° C. reaction is completed rapidly. The preferred temperature of operation is 125° to 160° C. The reaction can be approximately followed by measuring the ammonia evolved. Usually 65–85% of the theoretical nitrogen can be collected by the time the reaction apparently ceases.

The products which result are brittle, hygroscopic solids or waxy materials, which are soluble in water if the caprolactam-polyamine condensate was water-soluble. The products are polyureas or ureido derivatives of the caprolactam-polyamine condensates.

They are useful as chemical intermediates which react with formaldehyde and other aldehydes to form methylol derivatives of interest as modifiers of cellulosic materials. They may be used to form co-condensates with urea and formaldehyde or melamine and formaldehyde or equivalent methylol-forming compounds and formaldehyde to give valuable and useful new condensates and resins useful in the textile finishing, paper making, and coatings arts.

Typical preparations of condensates of this invention follow. Parts are by weight.

*Example 1*

(a) A reaction vessel, equipped with thermometer, reflux condenser, and gas inlet tube was charged with 565 parts by weight of epsilon-caprolactam and 515 parts by weight of diethylenetriamine. The vessel was heated at 200°–210° C. for 48 hours while a slow stream of nitrogen was passed through the charge. The reaction mixture was then heated to 220° C. while the pressure in the vessel was reduced to 30 mm. There was collected a distillate of 321 parts; 746 parts of condensate remained in the flask. This is a light yellow, viscous liquid which is soluble in water. It contains 11.95% of titratable nitrogen and 21% of total nitrogen, indicating a ratio of two caprolactam units per polyamine unit. When it is reacted with acetic anhydride and back titrated with potassium hydroxide to determine active hydrogen, it gives a number of 536 (milligrams of KOH per gram). For a 2:1 condensate of caprolactam and polyamine the theoretical number is 511. The product is soluble in water.

(b) There were mixed 225 parts by weight of the above condensate and 108 parts of urea in a reaction vessel equipped with stirrer, thermometer, and condenser which was connected to a gas absorption trap containing water to collect evolved ammonia. The above mixture was a 1:1 mixture of urea to titratable nitrogen, —NH—. The charge was heated by means of an oil bath. At about 100° C. it became clear. The stirrer was started and heating was continued with the temperature rising to 130° C. in two hours. After another two hours the temperature reached 160° C. The charge was then poured onto a metal tray to cool. There had been collected 85% of the theoretical amount of ammonia based on the urea charged. The product was a pale yellow, translucent, brittle solid which was soluble in water. It was reactive with formaldehyde to form methylol derivatives.

*Example 2*

(a) In the same way as in Example 1(a) there were mixed and heated 113 parts of epsilon-caprolactam and 52 parts of diethylenetriamine. This is a 2:1 mole ratio. There were stripped off 29.5 parts of polyamine. The product has an apparent average molecular weight of 476, a titratable nitrogen content of 8.83%, and a total nitrogen content of 18.9%. These data show a reacted mole ratio of 3.3 moles of caprolactam per mole of polyamine. The product is somewhat soluble in water.

(b) There were mixed 90 parts of the above 3:1 condensate and 34 parts of urea (1:1 ratio of urea to titratable —NH— group) and the mixture was heated as in Example 1(b) for four hours between 110° C. and 160° C. At the end of this time the amount of ammonia collected was 65% of the theoretical based on the urea charged. The product appeared similar to that of Example 1(b). It was water-soluble and reactive with formaldehyde.

*Example 3*

(a) In the same way as above there were reacted 226 parts of epsilon-caprolactam and 52 parts of diethylenetriamine. This is a 4:1 mole ratio of reactants. The product contains 6.98% of titratable nitrogen and 17.6% of total nitrogen. This product is not soluble in water.

(b) There were mixed 120 parts of this product and 35.8 parts of urea. The mixture was heated and stirred for five hours with the temperature being carried to about 165° C. The ammonia collected as above was 70% of the theoretical, based on the urea charged. The product when cool was a yellow brittle solid which was poorly soluble in water.

*Example 4*

(a) There were mixed 452 parts of epsilon-caprolactam and 146 parts of triethylenetetramine. The mixture was heated to 180° and then to 200° C. while it was stirred with a slow stream of nitrogen. It was then stripped at 230° C./20 mm. The residue was a viscous oil which contained 6.2% of titratable nitrogen and 17.8% of total nitrogen. The product is partially soluble in water.

(b) There were mixed 150 parts of the above oil and 60 parts of urea (a 1:1 ratio) and the mixture was heated and reacted as above. The temperature was carried to about 155° C. with evolution of 75% of the theoretical nitrogen. The product was a yellow solid which was soluble in hydrochloric acid.

*Example 5*

(a) In the same way there were reacted 452 parts of caprolactam and 292 parts of triethylenetetramine at 220°–230° C. The mixture was stripped at 20–30 mm. pressure to give 124 parts of distillate. The average molecular weight found was 375. The product contains 9.9% of titratable nitrogen and 20.3% of total nitrogen. The product is soluble in water. The composition apparently contains two caprolactam units per polyamine unit.

(b) There were mixed 200 parts of the above caprolactam-triethylenetetramine condensate and 130 parts of urea. This mixture was reacted by heating as above, an end temperature of 170° C. being reached after four hours. There was collected 80% of the theoretical nitrogen (based on titratable —NH— groups). The product was cooled and was a yellow brittle solid which was soluble in water.

*Example 6*

(a) In the same way there were reacted 339 parts of caprolactam and 438 parts of triethylenetetramine. There were stripped from the reaction mixture 229 parts of amine. The product obtained as a residue contained 12.8% of titratable nitrogen and 22.2% of total nitrogen. The apparent average molecular weight was 287.

(b) There were mixed 200 parts of the above condensate and 80 parts of urea. The mixture was reacted at 100°–150° C. as above. The product was cooled to give a hygroscopic solid which was water-soluble.

*Example 7*

(a) In the same way there were reacted 113 parts of caprolactam and 189 parts of tetraethylenepentamine. The reaction mixture was stripped at 240° C./20–30 mm. The condensate obtained as a residue was soluble in water. It contained 12% of titratable nitrogen and 20% of total nitrogen.

(b) There were mixed and reacted between 120° and 150° C. 100 parts of the above condensate and 50 parts of urea. The product was a brittle solid which was soluble in water.

*Example 8*

(a) In the same way there were reacted together 189 parts of tetraethylenepentamine and 226 parts of epsilon-caprolactam. The condensate contained 20.5% of total nitrogen and 13% of titratable nitrogen.

(b) There were mixed and reacted at 110°–160° C. as above 100 parts of the above condensate and 75 parts of urea. The product was a hygroscopic solid which was soluble in water.

*Example 9*

(a) In the same way there were reacted 113 parts of epsilon-caprolactam and 60 parts of ethylenediamine. The resulting condensate contains 18% of total nitrogen and 11% of titratable nitrogen.

(b) Upon mixing and reacting together at 120°–160° C. 100 parts of the above condensate and 60 parts of urea there was obtained a yellowish resinous material, which was reactive with formaldehyde and other aldehydes.

In the same way other alkylene polyamines can be reacted with caprolactam to give nitrogenous condensates. These are not evidently single entities, but appear to be mixtures of two or more species. Apparent molecular weights are merely averages for the mixture of compounds. This situation in no way interferes with the utility of the condensates as obtained.

The condensates are conveniently and clearly defined as those obtained by reacting together between 150° and 250° C. epsilon-caprolactam and a polyamine of the structure $NH_2(ANH)_xH$ where A is an alkylene group of two to three carbon atoms and $x$ is an integer from one to five or more.

The condensates are reacted with urea to give ureido derivatives thereof. The products of this reaction are soluble materials when suitable ratios are used in combining the various reactants.

The resulting products are polyureidopolyamides in which the amide function can react with aldehydes, particularly formaldehyde. The polyamide compounds differ from previously known polyureidopolyamine condensates in solubilities, compatibilities, and other properties. For example, they are soluble in methanol and various other water-miscible solvents. They are light in color. They are not precipitated by anion-active materials, such as urea-formaldehyde-sulfite condensates or polyacrylates. They have moderately large molecules which are monomeric in charatcer. They have good chemical stability.

I claim:

1. A method for preparing water-soluble polyureidopolyamides which comprises reacting together between 150° and 250° C. until a water-soluble condensate is formed epsilon-caprolactam and an alkylene polyamine having an alkylene group of two to three carbon atoms, the mole ratio in the reacting mixture of said caprolactam to said polyamine being from 1:1 to 3:1, and reacting said soluble condensates and urea by heating them together between 100° and 200° C. with evolution of ammonia.

2. A method for preparing water-soluble polyureidopolyamides which comprises reacting together between 150° and 250° C. until a water-soluble condensate is formed one to three moles of epsilon-caprolactam and one mole of an alkylene polyamine of the formula $NH_2(ANH)_xH$, wherein A is an alkylene group of two to three carbon atoms and $x$ is an integer having a value not over five, and reacting said soluble condensate and urea by heating them together between about 110° and about 160° C. with evolution of ammonia.

3. A method for preparing water-soluble polyureidopolyamides which comprises reacting between 150° and 250° C. until a water-soluble condensate is formed a mixture of one to three moles of epsilon-caprolactam and one mole of a polyethylenepolyamine and reacting said soluble condensate and urea by heating a mixture thereof between about 110° and 160° C. with evolution of ammonia.

4. The process of claim 3 in which the polyethylenepolyamine is diethylenetriamine.

5. The process of claim 3 in which the polyethylenepolyamine is triethylenetetramine.

6. The process of claim 3 in which the polyethylenepolyamine is tetraethylenepentamine.

7. Polyureidopolyamides prepared by the process of claim 1.

8. Polyureidopolyamides prepared by the process of claim 3.

9. Polyureidopolyamides prepared by the process of claim 4.

10. Polyureidopolyamides prepared by the process of claim 5.

11. Polyureidopolyamides prepared by the process of claim 6.

References Cited in the file of this patent

FOREIGN PATENTS

| | | |
|---|---|---|
| 457,909 | Italy | June 17, 1950 |
| 457,911 | Italy | June 17, 1950 |